United States Patent [19]

Behrens

[11] 4,202,963
[45] May 13, 1980

[54] VULCANIZATION SYSTEM FOR THIODIETHANOL-BASED ELASTOMERS

[75] Inventor: Rudolf A. Behrens, Gladstone, N.J.

[73] Assignee: American Cyanamid Company, Stamford, Conn.

[21] Appl. No.: 17,655

[22] Filed: Mar. 5, 1979

[51] Int. Cl.² ............................................. C08G 75/04
[52] U.S. Cl. .................................. 528/374; 260/18 R; 260/37 R; 528/293; 528/364; 528/376; 528/389; 260/23 R
[58] Field of Search ............... 528/374, 376, 389, 293, 528/364

[56] References Cited

U.S. PATENT DOCUMENTS

| | | | |
|---|---|---|---|
| 3,951,927 | 4/1976 | Aloia | 528/376 |
| 3,985,708 | 10/1976 | Chang et al. | 528/205 |
| 4,000,213 | 12/1976 | Chang | 260/830 S |
| 4,028,305 | 6/1977 | Li et al. | 528/309 |

*Primary Examiner*—Melvyn I. Marquis
*Attorney, Agent, or Firm*—Frank M. Van Riet

[57] ABSTRACT

The present invention relates in general to sulfur-vulcanizable elastomers derived from thiodiethanol and, in particular to the provision of a novel vulcanization system therefor comprising sulfur and an aliphatic linear, branched chain of cyclic polyethyleneamine or a dissociable organic salt thereof.

11 Claims, No Drawings

VULCANIZATION SYSTEM FOR THIODIETHANOL-BASED ELASTOMERS

BACKGROUND OF THE INVENTION

Elastomers, based on the condensation of a major proportion of thiodiethanol with one or more aliphatic diols containing a sulfur-vulcanizable double bond, are described by Aloia, U.S. Pat. No. 3,951,927; Chang et al., U.S. Pat. No. 3,985,708; Chang, U.S. Pat. No. 4,000,213; and Li et al., U.S. Pat. No. 4,028,305, all of which are incorporated herein by reference. Heretofore, application of conventional sulfur vulcanization systems, e.g., sulfur, zinc oxide, benzothiazole sulfenamides, thiuram sulfides, mercaptobenzothiazole, and the like, to the vulcanization of these elastomers has been less than satisfactory. Zinc oxide has heretofore been considered to be essential to the vulcanization of unsaturated elastomers with sulfur. In the vulcanization of thiodiethanol-based elastomers of the invention, conventional sulfur-vulcanization systems containing zinc oxide result in a fast cure, but the vulcanized elastomers exhibit poor heat ageing as manifested by high compression set and poor continuous stress-relaxation. However, when zinc oxide is omitted from the cure system, the cure rate is impractically slow. All of these factors indicate that there is a need for a vulcanization system to vulcanize thiodiethanol-based elastomers.

In order for an elastomer to achieve commercial success, it must be vulcanizable to useful products with an efficient, practical vulcanization system. It is an object of the invention to provide such a system. It is also an object of the invention to provide useful vulcanized products from thiodiethanol-based elastomers, and to provide elastomers exhibiting significantly improved aged properties, such as compression set.

SUMMARY OF THE INVENTION

The present invention provides a novel vulcanization system for thiodiethanol-based elastomers, comprising sulfur and an aliphatic linear, branched chain or cyclic polyethyleneamine, or mixture thereof, or a dissociable organic salt thereof.

DESCRIPTION OF THE INVENTION INCLUDING PREFERRED EMBODIMENTS

The aliphatic linear, branched chain or cyclic polyethyleneamines which are useful in the vulcanization system of the present invention range from relatively simple polyethyleneamines, which are represented by the formula:

$$H\text{-}[HN\text{---}(CH_2)_2]_n\text{-}NH_2 \quad (I)$$

wherein n is an integer from 1 to about 10, to complex reaction products of ethylene dichloride and ammonia, which boil above the boiling point of diethylenetriamine (206.7° C.), to dissociable organic salts of polyethyleneamines produced by reaction thereof with acids having a dissociation constant less than about $10^{-3}$, or mixtures of any of the above materials.

Polyethyleneamines representative of the above formula (I) include:
ethylenediamine
diethylenetriamine
triethylenetetramine
tetraethylenepentamine
pentaethylenehexamine, and the like.

The complex polyethyleneamine reaction mixtures contain linear, branched chain and cyclic structures which include, for example, the following:

$$H_2N\text{---}CH_2CH_2\text{---}NH\text{---}CH_2CH_2\text{---}NH\text{---}CH_2CH_2\text{---}NH\text{---}CH_2CH_2\text{---}NH\text{---}CH_2CH_2\text{---}NH_2$$
Pentaethylenehexamine

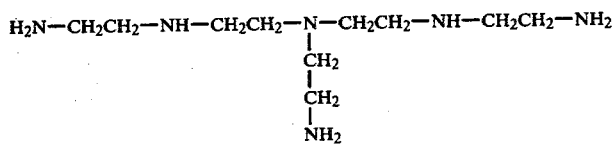
Symmetrical diaminoethyltriaminoethylamine

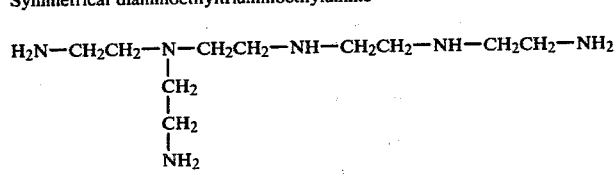
Unsymmetrical diaminoethyltriaminoethylamine

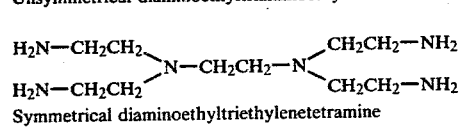
Symmetrical diaminoethyltriethylenetetramine

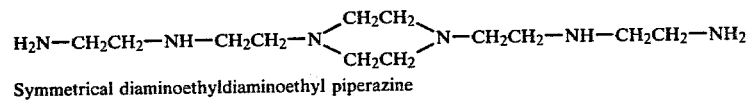
Symmetrical diaminoethyldiaminoethyl piperazine

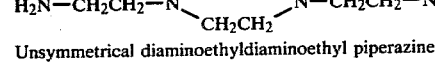
Unsymmetrical diaminoethyldiaminoethyl piperazine

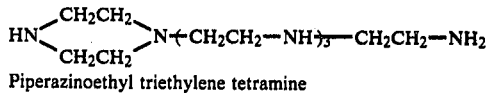
Piperazinoethyl triethylene tetramine

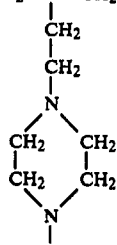
4-(N-piperazinoethyl)triethylene tetramine

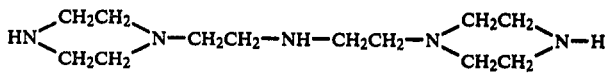
Bispiperazinoethylamine

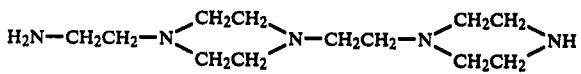
Aminoethyl diperazinoethane

In addition to the linear, branched chain and cyclic polyethyleneamines, organic salts thereof, which dissociate under vulcanization conditions to liberate the free amine, may also be used.

Useful organic salts are those which are formed from acids having a dissociation constant less than than about $10^{-3}$, and including salts of aliphatic carboxylic acids, especially those of 2–18 carbon atoms, carbonic acid, carbamic acid and the like. Particularly useful salts are the fatty acid salts, e.g., the stearate. Useful salts also include the condensation products of polyethyleneamines and the aforementioned fatty acids, for example stearic acid, such as diethylenetriamine-stearic acid condensate.

The vulcanizable thiodiethanol-based elastomers useful in the present invention are preferably those disclosed in the aforementioned patent to Aloia and Chang et al. ('708).

Specifically, the vulcanizable elastomers of thiodiethanol is a polymer represented by the formula

  (II)

wherein —OG— comprises randomly alternating structural units selected from (E) structural units (III) and (IV)

  (III)

  (IV)

or (F) structural units (III), (IV) and (V)

  (V)

wherein R is one or more radicals remaining on removal of two hydroxyl groups from:

(a) saturated aliphatic, linear, branched chain or cyclic diols, or (b) aliphatic linear, branched chain or cyclic diols containing external unsaturation having an allylic hydrogen atom, wherein R' is one or more radials which remain on removal of two hydroxyl groups from a diphenolic compound, said polymers comprising structural units (E) and (F) being characterized in that:

(1) m is an integer sufficient to provide in said polymer an average molecular weight of at least 8000;

(2) the molar ratio of (III) to (IV), when said polymer comprises structural units (E), or the molar ratio of (III) to the total of (IV) and (V) when said polymer comprises structural units (F), being not less than 1:1 and (3) they contain from about 1 to 10 mole percent of said diol (b) based on the total of all units (III), (IV) and (V) present in said polymer.

The vulcanization system of the invention comprises sulfur in an amount of from about 0.3 to 3.0 parts by weight per hundred parts of elastomer, preferably 0.3 to 2.0 parts, same basis. The polyethylene amine may be used in an amount of from about 1 to 6 parts thereof per 100 parts of elastomer, preferably from about 2 to 4 parts, same basis.

In addition to sulfur and the polyamine compound, the vulcanizable elastomer composition may contain other conventional rubber compounding ingredients, such as fillers and re-inforcing agents, e.g., carbon black, precipitated hydrous silica, titanium dioxide, calcium carbonate, calcium silicate, and the like; calcium oxide or calcium stearate (or other fatty acid salt) to neutralize acid catalyst residues in the elastomers; processing aids, such as sorbitan monostearate or stearic acid; sulfur-donating compounds, mercaptobenzothiazole; sulfenamides; thiuram sulfides, and the like, without departing from the scope of the invention.

The vulcanizable compositions may be prepared by conventional rubber compounding techniques, using a two-roll rubber mill or a Banbury mixer, at temperatures of 300° F. The compositions are vulcanized at similar temperatures, preferably about 325°–350° F. for about 15 to 60 minutes and, optionally, post-cured for periods of time to develop full cures.

The following examples are set forth for purposes of illustration only and are not to be construed as limitations on the present invention. All parts and percentages are by weight unless otherwise specified.

EXAMPLE 1

An elastomeric copolymer of 80% thiodiethanol, 15% isopropylidenebisphenol and 5% trimethylolpropane, monoallyl ether was compounded as follows:

|  | Parts by Weight |
|---|---|
| Elastomer | 100 |
| Carbon Black | 60 |
| Calcium oxide | 3 |
| Sorbitan monostearate | 2 |
| Sulfur | 1.5 |
| Tetramethyl thiuram disulfide | 1.5 |
|  | 168.0 |

To separate portions (168 parts) of the above formulation was added:

|  | A | B | C |
|---|---|---|---|
| Zinc oxide | 5.0 | — | — |
| Mercaptobenzothiazole | 1.5 | 2.0 | 2.0 |
| Polyamine D* | — | — | 4.0 |

*Mixture of aliphatic and cyclic polyethyleneamines boiling above 340° C.

Each of the compositions A thru C was cured for 60 minutes at 330° F. and then post-cured for 16 hours at 120° C. before testing.

Rheology of the compositions was studied using a Monsanto Oscillating Disc Rheometer operating at 330° F.

| Rheometer | A | B | C |
|---|---|---|---|
| Max. cure rate (inch-lbs./min.) | 6.5 | 0.1 | 1.45 |
| Max. torque (inch-lbs.) | 40.5 | — | 87 |
| Torque after 15 minutes (inch-lbs.) | 40.5 | 9 | 35 |

Stress-strain properties of the cured compositions using an Instron tester were as follows:

| | | | |
|---|---|---|---|
| Tensile, psi | 1100 | 750 | 1660 |
| Elongation, % | 220 | 375 | 300 |
| Hardness, Shore "A" | 71 | 60 | 78 |

Continuous stress-relaxation studies were made to measure the thermal stability of the compositions. The elastomer samples were tested on an autographic stress-relaxometer consisting of load-sensing elements, a means for extending and maintaining the specimens at a constant elongation, and a circulating air oven. The oven temperature was maintained at a temperature of 150° C.±0.1° C. and the samples extended to 5±0.05%. The decrease in modulus with time is recorded automatically. Data relating to the relative thermal stability are obtained from plots of f(t)/f(0) versus log time, or log f(t)/f(0) versus time, where f(t) and f(0) are the forces at time t and t=0, respectively, required to maintain the sample at a given extension. The data are reported as $\tau_{50}$, which represents the time at 150° C. that is required for a sample to degrade to a value equal to 50% of the initial stress, which is a measure of the amount of degradation experienced by the specimen.

| Continuous Stress-Relaxation | | | |
|---|---|---|---|
|  | A | B | C |
| $\tau_{50}$ minutes | 350 | — | 2450 |

The data illustrate that Composition A, which represents a conventional sulfur vulcanization system, provides a fast cure rate, but exhibits poor thermal stability compared to Composition C which is many times more stable and which exhibits a good cure rate and develops good mechanical properties. Composition B demonstrates that a very poor cure is obtained without zinc oxide in a conventional vulcanization system.

EXAMPLE 2

Following the procedure of Example 1 an elastomeric copolymer of 90% thiodiethanol - 5% diethyleneglycol - 5% trimethylolpropane, monoallyl ether was compounded as follows:

|  | Parts by Weight |
|---|---|
| Elastomer | 100 |
| Carbon black | 50 |
| Antioxidant* | 2 |
| Tetramethyl thiuram disulfide | 1.5 |
| Mercaptobenzothiazole | 2.0 |
| Sulfur | 1.5 |
| Calcium stearate | 3.0 |
|  | 160.0 |

*Di-β-naphthyl-p-phenylenediamine

To separate portions (160 parts) of the above formulation was added:

|  | D | E | F |
|---|---|---|---|
| Polyamine D (See Example 1) | 2 | 3 | 4 |

The compositions were cured for 30 minutes at 330° F. and post-cured for 16 hours at 120° C. Properties were as follows:

|  | D | E | F |
|---|---|---|---|
| Monsanto Rheometer @ 330° F. | | | |
| Max. cure rate | 1.4 | 2.1 | 2.4 |
| Max. torque | 80+ | 95+ | 95+ |
| Torque after 15 minutes | 39 | 51 | 51 |
| Instron Stress-Strain Properties | | | |
| Tensile, psi | 1645 | 1715 | 1490 |
| Elongation, % | 370 | 300 | 270 |
| Compression Set, % (Method B: 22 hrs. at 120° C.) | 89 | 62 | 41 |
| Continuous Stress-Relaxation | | | |
| $\tau_{50}$ minutes | 125 | 425 | 1200 |

The data illustrate that good cures are obtained using 2 to 4 parts per hundred of Polyamine D and that the higher concentrations tend to provide increased thermal stability, as manifested by improved compression set and stress-relaxation.

EXAMPLE 3

An elastomeric copolymer of 90% thiodiethanol - 5% diethyleneglycol - 5% trimethylolpropane, monoallyl ether was compounded as follows:

|  | Parts by Weight |
| --- | --- |
| Elastomer | 100 |
| Carbon black | 50 |
| Calcium stearate | 5 |
| Sulfur | 1.5 |
| Mercaptobenzothiazole | 1.5 |
| Tetramethyl thiuram disulfide | 1.5 |
|  | 159.5 |

Separate portions (159.5 parts) were compounded with the following (all at 4 parts per hundred of rubber of active material).

|  | G | H | J | K |
| --- | --- | --- | --- | --- |
| Triethylenetetramine | 4 | — | — | — |
| Tetraethylenepentamine | — | 4 | — | — |
| Polyamine D** (50% on silical) | — | — | 8 | — |
| Polyamine H* | — | — | — | 4 |

*Complex polyethyleneamine reaction product boiling above 340° C. and containing 24–28% by weight of diethylenetriamine
**See Example 1

The compositions were cured for 30 minutes at 330° F. and post-cured for 4 hours at 120° C.

Torque (inch-pounds) was measured at 330° F. after 30 minutes using a Monsanto Oscillating Disc Rheometer. This is an indication of the extent of cure of the composition.

|  | G | H | J | K |
| --- | --- | --- | --- | --- |
| Torque after 30 min. | 61 | 60 | 66 | 66 |

The stress-strain properties, obtained on an Instron tester, were as follows:

| Tensile, psi | 1520 | 1550 | 1500 | 1540 |
| --- | --- | --- | --- | --- |
| Elongation, % | 490 | 455 | 470 | 435 |
| Hardness, Shore "A" | 74 | 76 | 75 | 77 |
| Compression Set, % (Method B: 22 hrs. at 120° C.) | 34 | 33 | 37 | 27 |

The data illustrate that good cures are obtained using various polyethyleneamines with sulfur and that the cured compositions exhibit good ageing resistance, as manifested by low compression set.

EXAMPLE 4

An elastomer of 90 percent thiodiethanol - 5% diethyleneglycol - 5% trimethylolpropane, monoallyl ether, was compounded as follows:

|  | Parts by Weight | |
| --- | --- | --- |
|  | Control | K |
| Elastomer | 100 | 100 |
| Carbon black | 50 | 50 |
| Calcium stearate | 5 | 5 |
| Sulfur | 1.5 | 1.5 |
| Mercaptobenzothiazole | 1.5 | 1.5 |
| Tetramethyl thiuram disulfide | 1.5 | 1.5 |
| Triethylenetetramine stearate | — | 4 |

The compositions were cured for 60 minutes at 330° F. Stress-strain properties are as follows:

|  | Control | K |
| --- | --- | --- |
| Tensile, psi | under | 1530 |
| Elongation, % | cured | 510 |
| Hardness, Shore "A" | ↓ | 67 |

EXAMPLE 5

The procedure of Example 1 was again followed except that the elastomer was prepared from thiodiethanol (95 parts) and the monoallyl ether of trimethylolpropane (5 parts). Similar results were achieved.

EXAMPLE 6

The procedure of Example 4 was again followed except that the monoallyl ether was replaced by 3-cyclohexene-1, 1-dimethanol. Similar results were achieved.

EXAMPLE 7

When the procedure of Example 4 was again followed except that the diethylene glycol was replaced by isopropylidene bisphenol, similar results were achieved.

EXAMPLE 8

The procedure of Example 1 was again followed except that Polyamine D was replaced by diethylenetriamine carbonate. Excellent results were observed.

EXAMPLE 9

Following the procedure of Example 8 except that the carbonate was replaced by the corresponding carbamate, the results were comparable.

I claim:

1. A vulcanizable elastomer composition comprising a mixture of (1) a vulcanizable elastomer of thiodiethanol, (2) sulfur, and (3) an aliphatic linear, branched chain, or cyclic polyamine selected from the group consisting of (A) polyethyleneamines represented by the formula (I):

$$H\text{-}[\text{HN CH}_2\text{CH}_2]_n\text{NH}_2 \qquad (I)$$

wherein n is an integer from 1 to about 10; (B) complex reaction mixtures of polyethyleneamines, boiling above the boiling point of diethylenetriamine, (C) salts of polyethyleneamines with organic acids having a dissociation constant less than about $10^{-3}$; and (D) mixtures thereof; said vulcanizable elastomer of thiodiethanol being a copolymer represented by the formula (II):

$$H\text{-}[\text{OG}]_m\text{OH} \qquad (II)$$

wherein —OG— comprises randomly alternating structural units selected from:

(E) structural units (III) and (IV)

$$\text{-}[\text{OC}_2\text{H}_4\text{SC}_2\text{H}_4]\text{-} \qquad (III)$$

$$\text{-}[\text{OR}]\text{-} \qquad (IV)$$

or (F) structural units (III), (IV), and (V)

$$+OR'+\quad(V)$$

wherein R is one or more radicals remaining on removal of two hydroxyl groups from:
- (a) saturated aliphatic linear, branched chain or cyclic diols, or
- (b) aliphatic linear, branched chain or cyclic diols containing external unsaturation having an allylic hydrogen atom;

wherein R' is one or more radicals which remain on removal of two hydroxyl groups from a diphenolic compound; said copolymers comprising structural units (E) and (F) being characterized in that:
- (1) m is an integer sufficient to provide in said copolymer an average molecular weight of at least 8000;
- (2) the molar ratio of (III) to (IV), when said copolymer comprises structural units (E), or the molar ratio of (III) to the total of (IV) and (V) when said copolymer comprises structural units (F), being not less than 1:1; and
- (3) containing from about 1 to 10 mole percent of said diol (b), based on the total of all units (III), (IV), and (V) present in said copolymer.

2. A vulcanizable elastomer composition in accordance with claim 1 wherein said copolymer of thiodiethanol comprises randomly alternating structural units (E).

3. A vulcanizable elastomer composition in accordance with claim 1 wherein said copolymer of thiodiethanol comprises randomly alternating structural units (F).

4. A vulcanizable elastomer composition in accordance with claim 1 wherein said polyamine comprises a polyethyleneamine represented by (A).

5. A vulcanizable elastomer composition in accordance with claim 4 wherein n is an integer from 3 to 6.

6. A vulcanizable elastomer composition in accordance with claim 1 wherein said polyamine comprises (B).

7. A vulcanizable elastomer composition in accordance with claim 1 wherein said polyamine comprises (C).

8. A vulcanizable elastomer composition in accordance with claim 7 wherein said acid is an aliphatic carboxylic acid, carbonic acid, or carbamic acid.

9. A vulcanizable elastomer composition in accordance with claim 8 wherein said acid is an aliphatic monocarboxylic acid containing from 2 to 18 carbon atoms.

10. A vulcanizable elastomer composition in accordance with claim 8 wherein said acid is carbonic acid.

11. A vulcanizable elastomer composition in accordance with claim 8 wherein said acid is carbamic acid.

* * * * *